Apr. 3, 1923.

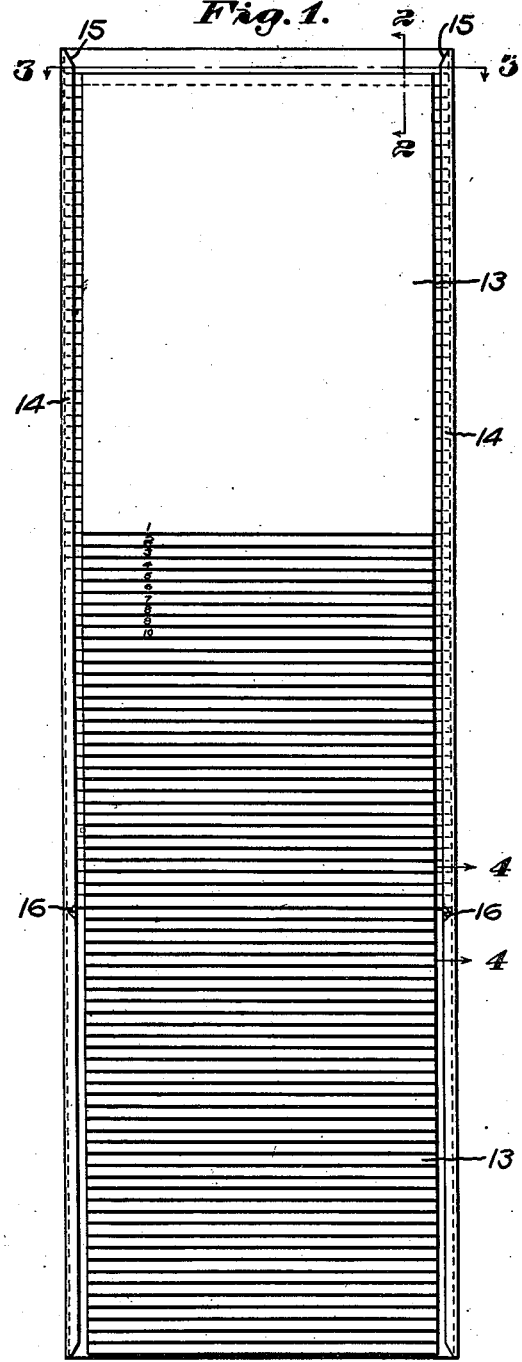
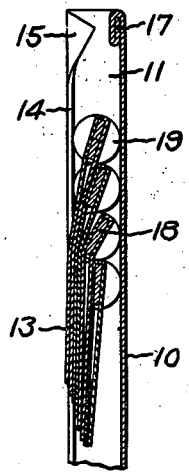
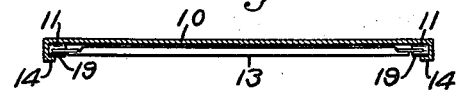
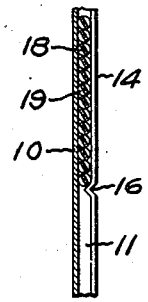

J. T. QUIGLEY 1,450,304

LOOSE LEAF INDEX FILE

Filed Nov. 16, 1914

Witnesses:
Carl L. Choate.
Llewellyn Richards.

Inventor:
John T. Quigley,
by Emery Booth Janney Varney
Attys.

Patented Apr. 3, 1923.

1,450,304

UNITED STATES PATENT OFFICE.

JOHN T. QUIGLEY, OF BOSTON, MASSACHUSETTS, ASSIGNOR, BY MESNE ASSIGNMENTS, TO COSTMETER COMPANY, OF BOSTON, MASSACHUSETTS, A CORPORATION OF MASSACHUSETTS.

LOOSE-LEAF INDEX FILE.

Application filed November 16, 1914. Serial No. 872,302.

*To all whom it may concern:*

Be it known that I, JOHN T. QUIGLEY, a citizen of the United States, and a resident of Boston, county of Suffolk, and State of Massachusetts (whose post-office address is 9 Norway St., Boston, Mass.), have invented an Improvement in Loose-Leaf Index Files, of which the following description, in connection with the accompanying drawings, is a specification, like characters on the drawings representing like parts.

This invention relates to indexes and files and is more especially concerned with a loose-leaf, visible-index file of that type in which the successive leaves overlie one another in such a manner that their margins present their index bearing edges in one plane so that the index numbers, and names, or subject matter, may be scanned quickly without handling them. One advantage is that the absence of any sheet from its holder or binding element is visually indicated by the mere absence of the edge of the sheet from its place, thus guiding the user to the precise point in the series to which the sheet should be restored.

My invention will be best understood by reference to the following specification when taken in connection with the accompanying drawings of one illustrative embodiment thereof, while its scope will be more particularly pointed out in the appended claims.

In the drawings:

Fig. 1 is a front elevation of a loose-leaf, visible-index file embodying my invention;

Fig. 2 is a sectional view, on an enlarged scale, on line 2—2 of Fig. 1;

Fig. 3 is a sectional view on line 3—3 of Fig. 1;

Fig. 4 is a sectional view on line 4—4 of Fig. 1;

Figure 5:
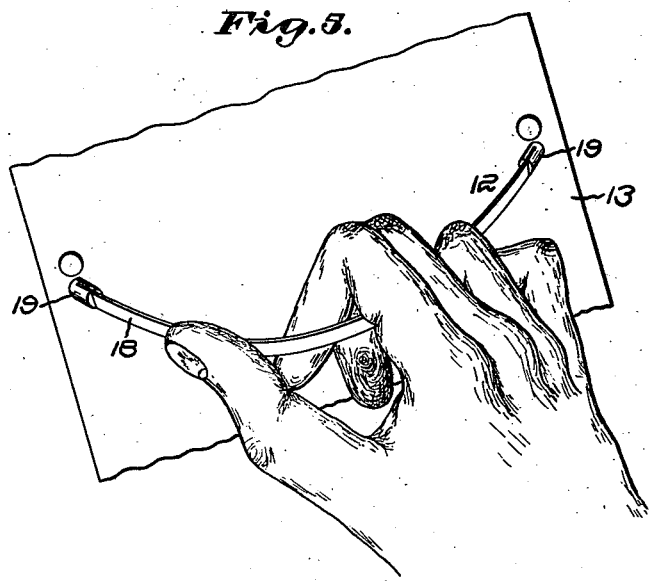
Fig. 5 is a perspective view illustrating one method of inserting a holding member into the perforations of its leaf.
Figure 6:
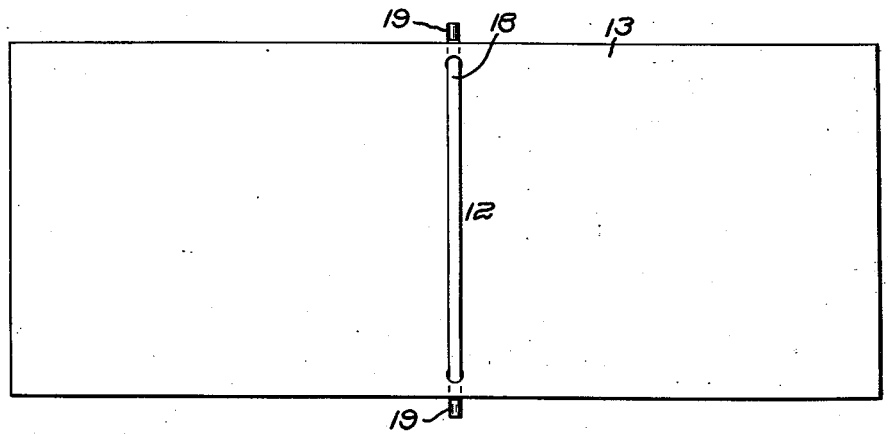
Fig. 6 is a plan of a leaf unfolded and with its holding member in place in its perforations.

Referring to the drawings, and to the embodiment of my invention which I have selected for illustration, I have there shown a loose-leaf, visible-index file comprising a holder 10 provided with opposed channels or grooves 11, 11 to receive a plurality of holding members or binding elements 12 for leaves 13. The holder 10 may be otherwise appropriately constructed but herein comprises a sheet metal plate of generally rectangular form having its two longitudinal edges bent to form flanges 14, 14 turned toward each other to form the grooves 11, 11.

Preferably the length of the holder is such as to receive and hold a definite number of holding members with their attached leaves, the latter overlying one another and the lower edge of the lowermost leaf terminating adjacent the lower edge of the holder. As a means for limiting the upward movement of the holding members, the holder may be provided with appropriate means, herein in the form of stops 15, 15 formed by bending the flanges 14, 14 inwardly adjacent their upper ends. The downward movement of the holding members may be defined by appropriate means, such for example as stops 16, 16, formed by bending the flanges 14, 14 inwardly at a suitable distance from their lower ends, whereby the lower edge of the lowermost leaf is properly positioned with relation to the lower edge of the holder and the latter forms a backing for all the leaves. If desired, the lower ends of the flanges may be bent inwardly the same as at 15, 15. If desired, the upper or lower edges or either of them may be stiffened by doubling the margin of the holder upon itself as at 17 to form a rib.

An important feature of my invention is the form and construction of the holding members or binding elements, and their mode of attachment to the sheets. According to the preferred construction each holding member or binding element comprises a flat strip 18, preferably of tempered spring steel, having a considerable degree of flexibility to enable it to be flexed with comparative freedom in one direction, to permit it to be sprung into and out of place in the channels, but sufficiently wide as to be rigid in a direction at right angles to the first direction. This strip is preferably provided at its ends with enlargements 19, 19 constituting trunnions or pivots whereby the holding member with its leaf may be swung about an axis while maintained in a definite position with relation to the holder and to the other holding members, so that the leaves may be turned to and fro for inspection and recording purposes and yet maintained in fixed positions with relation to the length of the holder.

Figure 7:
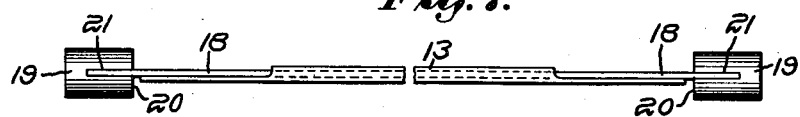
Fig. 7 is an edge view of a leaf and its holding member on an enlarged scale.

The enlargements 19, 19 perform another important function,—that of serving as stop to lock the sheets to the holding members, as well as to position the sheets with reference to the length of the holding members and the width of the holder. To this end, the enlargements are provided with abrupt shoulders 20, 20 having a space therebetween slightly greater than the width of the sheet whereby the latter is properly positioned (see Fig. 7).

The enlargements or trunnions 19, 19 may be formed on or attached to the strip 18 in any appropriate manner but herein the terminal portions of the latter are inserted in slots 21, 21 formed in the trunnions, the latter then being subjected to pressure to cause it to grip the strip so tightly as to unite the trunnions with the strip in a permanent and durable manner.

Each of the holding members may be removably attached to its leaf in any suitable manner, as for example by providing the latter with two perforations 22, 22, through which the member may be passed, after which the shoulders 20, 20 will lock the member in place until it is intentionally removed. The insertion of the holding member in the holes in the sheet may be accomplished by bending or buckling the latter, or the holding member may be flexed or bent, as illustrated in Fig. 5, until its ends can be inserted in the perforations. This may be accomplished conveniently by the use of one hand to manipulate the holding member and the other hand to hold the sheet. The removal of the sheet and its holding member from and its replacement in the channels of the holder may be accomplished in a similar manner by flexing both the sheet and holding member.

The sheet might be single, if desired, but is herein shown folded, and if desired, both portions may be of equal length when folded. The sheet, when folded, will be creased preferably along a line approximately tangent to the perforations 22, 22, so that the edge of the strip 18 will fit snugly into the fold and constitute a reinforcement which will effectually prevent the sheet from becoming torn with ordinarily careful handling, and even when subjected to considerable strain. In fact, with a sheet of ordinary thickness its strength is so great, when attached to the holding member in the described manner, that the entire index may be lifted and sustained by one leaf.

It will now be apparent that the described index has many advantages which will commend it to the user. It combines the advantages of a loose-leaf system with those of a visible index, the filing and indexing means being combined through the use of a separable binding element, capable of repeated and unlimited use with successive leaves. It also possesses the advantage of facility of handling and reversing the leaves, yet with perfect security of the leaf when in place. One equipment of holders and binding elements may be used indefinitely without deterioration, on successive complete sets of new paper. Another advantage is that comparatively thin and inexpensive paper may be used with results equal to those obtained in the use of expensive, strong paper. Still another advantage is that the sheets with the binding elements removed, may be prepared on a typewriter and then replaced.

While I have herein shown and described one form or embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made without departing from the principles thereof.

Having thus described one embodiment of my invention, what I claim and desire by Letters Patent to procure is:

1. In an adjustable index or file, the combination of a holder presenting two supports, an elongated supporting element held by said holder and overlapped by said supports, and a record-receiving element directly interlocking with and supported by said supporting element, one of said elements having provision to flex into and out of interlocking relationship with the other, and said supporting element having means interlocked with and positioning said record-receiving element intermediate and out of engagement with said supports.

2. The combination with a sheet of flexible material, of a member removably attached thereto and provided with shoulders facing each other and between which the sheet is interposed and positioned lengthwise of said member.

3. The combination with a sheet of flexible material, of a flexible member removably attached thereto and provided with shoulders facing each other and between which the sheet is interposed and positioned lengthwise of said member.

4. The combination with a sheet of flexible material provided with perforations, of a flexible member extending through said perforations and provided with shoulders facing each other and between which the sheet is interposed and positioned lengthwise of said member.

5. The combination with a sheet of flexible material provided with perforations, of a member extending therethrough and having a substantially flat flexible portion lying against the face of the sheet, and enlarged terminal portions having shoulders which define the position of the sheet with reference to the length of said member.

6. The combination with a sheet of flexible material provided with perforations, of a member extending therethrough and having a substantially flat flexible portion lying against the face of the sheet, and trunnions at its terminal portions provided with shoulders facing each other and between which the sheet is interposed.

7. A sheet holding device for index sheets comprising a flexible strip, and trunnions provided with openings into which the terminal portions of said strip are received, said trunnions being held in place on said strip by reason of the frictional engagement of said strip with the walls of said openings.

8. A sheet holding device for index sheets comprising a thin flexible metallic strip, and trunnions provided with openings in which the terminal portions of said strip are received.

9. A sheet holding device for index sheets comprising a flexible tempered spring steel strip, and trunnions provided with openings in which the terminal portions of said strip are received.

10. In an adjustable index or file, the combination of a plurality of sheets having flexible holding or binding members, and a holder therefor provided with opposed channels into which said members extend at their opposite ends, said holder having stop means adjacent one edge to limit the movement of said members toward such edge, and stop means disposed at a distance from the opposite edge approximately equal to the width of the sheet whose binding member is nearest such edge.

11. In a device of the class described, the combination of a mounting presenting guide channels, a plurality of overlapping folded sheets each provided with a plurality of openings adjacent to its fold, and a plurality of sheet-supporting bars guided by said channels and each threaded through the openings of its sheet, said bars having provision to swing about generally parallel axes.

12. In a device of the class described, the combination of a mounting presenting guide channels, a plurality of overlapping folded sheets each provided with a plurality of apertures adjacent to its fold, and a plurality of sheet-supporting bars guided by said channels and each threaded through the apertures of its sheet, said bars having cylindrical portions permitting said bars to be swung about generally parallel axes.

13. In a device of the class described, the combination of a mounting having flanges presenting guides, a plurality of overlapping folded sheets provided each with a plurality of perforations adjacent to its fold, and a plurality of sheet-supporting bars guided by said guides and each threaded through the perforations of one of said sheets, said bars having means to prevent engagement of said sheets with said flanges and said mounting having means to limit lengthwise movement of said bars.

14. In a device of the class described, the combination of a pair of guides, a plurality of folded sheets having overlapping margins and provided each with a plurality of perforations adjacent to its fold, a plurality of sheet-supporting bars guided by said guides and each threaded through the perforations of one of said sheets, and cylindrical means to hold each bar spaced from the next adjacent bar while still permitting said sheets to be swung about parallel axes.

15. In a device of the class described, the combination of a pair of guides, a plurality of folded sheets having overlapped margins and provided each with a plurality of perforations adjacent to its fold, a plurality of sheet-supporting bars guided by said guides and each threaded through the perforations of one of said sheets, and cylindrical means carried by each bar to hold the same spaced from the next adjacent bar while still permitting said sheets to be swung about parallel axes.

16. In a device of the class described, the combination of a pair of guides, a plurality of folded sheets having overlapping margins and provided each with a plurality of perforations adjacent to its fold, a plurality of sheet-supporting bars guided by said guides and each threaded through the perforations of one of said sheets, and means carried by each bar to hold the same spaced from the next adjacent bar and to limit movement of the sheet lengthwise of the bar.

17. In an adjustable index or file, the combination of a holder having opposed channels, a plurality of binding elements having their opposite ends, respectively, terminating in said channels, and provided with shoulders disposed intermediate said channels, and a plurality of sheets held by said binding elements, respectively, and received between said shoulders.

18. In an adjustable index or file, the combination of a holder having opposed channels, a plurality of binding elements having their opposite ends, respectively, terminating in said channels, and provided with shoulders facing each other and disposed intermediate said channels, and a plurality of sheets held by said binding elements, respectively, and received between said shoulders.

19. In an adjustable index or file, the combination of a holder having opposed channels, a plurality of binding elements having their opposite ends, respectively, terminating in said channels, and a plurality of sheets provided with perforations through which said binding elements are threaded, said binding elements having means to limit movement of said sheets toward said channels.

20. In an adjustable index or file, the combination of a holder having flanges presenting opposed channels, a plurality of binding elements having their opposite ends, respectively, terminating in said channels, and provided with shoulders disposed intermediate said channels, and a plurality of sheets held by said binding elements, respectively, and received between said shoulders, said binding elements being limited by said holder to a lengthwise movement less than the distance from one of said flanges to the adjacent shoulder.

21. In an adjustable index or file, the combination of a holder having flanges presenting opposed channels, a plurality of binding elements having their opposite ends, respectively, terminating in said channels, and provided with shoulders disposed intermediate said channels, and a plurality of sheets held by said binding elements, respectively, and received between said shoulders, said binding elements being limited by said channels to a lengthwise movement less than the distance from one of said flanges to the adjacent shoulder.

22. In an adjustable index, the combination of a holder having opposed channels, a plurality of sheet-supporting rods provided with enlarged trunnions adjacent opposite ends thereof mounted in said channels, and a plurality of overlapping sheets supported by said rods, respectively.

23. In an adjustable index, the combination of a holder having opposed channels, a plurality of flexible, resilient, sheet-supporting wires provided with enlarged trunnions adjacent opposite ends thereof mounted in said channels, and a plurality of overlapping sheets supported by said wires, respectively.

24. In an adjustable index, the combination of a holder having opposed channels, a plurality of sheet-supporting rods provided with trunnions adjacent opposite ends thereof mounted in said channels, said rods being provided with shoulders intermediate said channels, and a plurality of sheets supported by said rods, respectively, and received between said shoulders.

25. In an adjustable index, the combination of a holder having opposed channels, a plurality of sheet-supporting rods provided with trunnions adjacent opposite ends thereof mounted in said channels, said rods being provided with shoulders intermediate said channels, and a plurality of sheets supported by said rods, respectively, and limited by said shoulders as to movement lengthwise of said rods.

26. In an adjustable index, the combination of a holder having opposed channels, a plurality of sheet-supporting rods provided with trunnions adjacent opposite ends thereof mounted in said channels, said trunnions being provided with shoulders intermediate said channels, and a plurality of sheets supported by said rods, respectively, and positioned by said shoulders with respect to the length of said rods.

27. In a device of the class described, the combination of a sheet, a sheet-supporting rod, a pair of generally cylindrical trunnions in which said rod is received, and a support for said rod.

28. In a device of the class described, the combination of a sheet, a sheet-supporting rod, a pair of generally cylindrical trunnions having axial openings in which said rod is received, and a support for said rod.

29. In a device of the class described, the combination of a holder having opposed channels, a plurality of sheet-supporting rods having adjacent opposite ends thereof, enlarged trunnions mounted to turn about their axes in and slide longitudinally of said channels, and a plurality of sheets supported by said rods and having overlapping margins spaced by said trunnions.

30. In an index, the combination of a pair of channels, a plurality of wires whose terminal portions are received in said channels, a plurality of overlapping sheets held by said wires, respectively, and cylindrical spacing means carried by said wires to maintain the latter in spaced relationship and to maintain the overlapping margins of said sheets in proper overlapping relationship.

31. In an index, the combination of a holder, a plurality of parallel wires held by said holder and mounted to move transversely; a plurality of overlapping sheets supported by said wires, respectively, and spacing means carried by said wires and having provisions to limit movement of said sheets lengthwise of said wires.

32. In an index, the combination of a holder, a plurality of parallel wires removably and replaceably held by said holder and mounted to move transversely, a plurality of overlapping sheets supported by said wires, respectively, and means carried by said wires and having provision to wedge adjacent wires apart upon the introduction of a given wire between two others.

33. In an index, the combination of a holder, a plurality of parallel wires removably and replaceably held by said holder and mounted to move transversely, a plurality of overlapping sheets supported by said wires, respectively, and spacing means carried by said wires and having provision to displace adjacent wires apart upon the introduction of a given wire between two others.

34. In an index, the combination of a holder, a plurality of parallel wires held by said holder and mounted to move transversely, a plurality of overlapping sheets supported by said wires, respectively, and means to maintain said wires in properly spaced relationship and to position said sheets lengthwise of said wires, said means comprising generally cylindrical spacers.

35. In an index, the combination of a holder, a plurality of parallel wires held by said holder and mounted to move transversely, a plurality of overlapping sheets supported by said wires, respectively, and means to maintain said wires in properly spaced relationaship and to position said sheets lengthwise of said wires, said means comprising generally cylindrical spacers limiting lengthwise movement of said sheets.

36. In a file, the combination of a series of overlapping sheets, and a series of sheet-supports supporting said sheets, respectively, providing for turning movement of said sheets about parallel axes, and carrying means spacing said supports transversely of said axes and also defining the positions of said sheets lengthwise of said axes throughout the range of turning movement of said sheets about said axes.

37. In a file, the combination of a mounting presenting guides, a series of overlapping sheets, and a series of sheet-supports guided by said guides, providing for turning movement of said sheets about parallel axes, and carrying means spacing said supports transversely of said axes and also defining the positions of said sheets lengthwise of said axes throughout the range of turning movement of said sheets about said axes.

38. In a file, the combination of a series of sheet supports, and a series of overlapping sheets directly supported by said sheet supports, respectively, and mounted to turn about parallel axes from an upstanding to a depending position, said sheet-supports carrying means spacing said supports transversely of said axes and also defining the positions of said sheets lengthwise of said axes in both upstanding and depending positions.

39. In a file, the combination of a series of sheet-supporting bars, and a series of overlapping sheets directly supported by and contacting with said bars, respectively, and mounted to turn about parallel axes, a mounting presenting guides for said bars, said bars having means extending transversely of said axes and said guides, spacing said supports transversely of said axes and also defining the positions of said sheets lengthwise of said axes.

40. In a file, the combination of a frame having guides presenting front and rear guiding surfaces, a series of sheet carriers guided by said guides and carrying means projecting transversely therefrom transversely of said guides whereby said carriers are prevented from moving past each other in said guides and having sheet-positioning shoulders intermediate said guides, and a series of overlapping sheets carried by said sheet carriers, respectively, and positioned by said means both longitudinally and transversely of said sheet carriers.

In testimony whereof, I have signed my name to this specification, in the presence of two subscribing witnesses.

JOHN T. QUIGLEY.

Witnesses:
EVERETT S. EMERY,
THOMAS B. BOOTH.